UNITED STATES PATENT OFFICE.

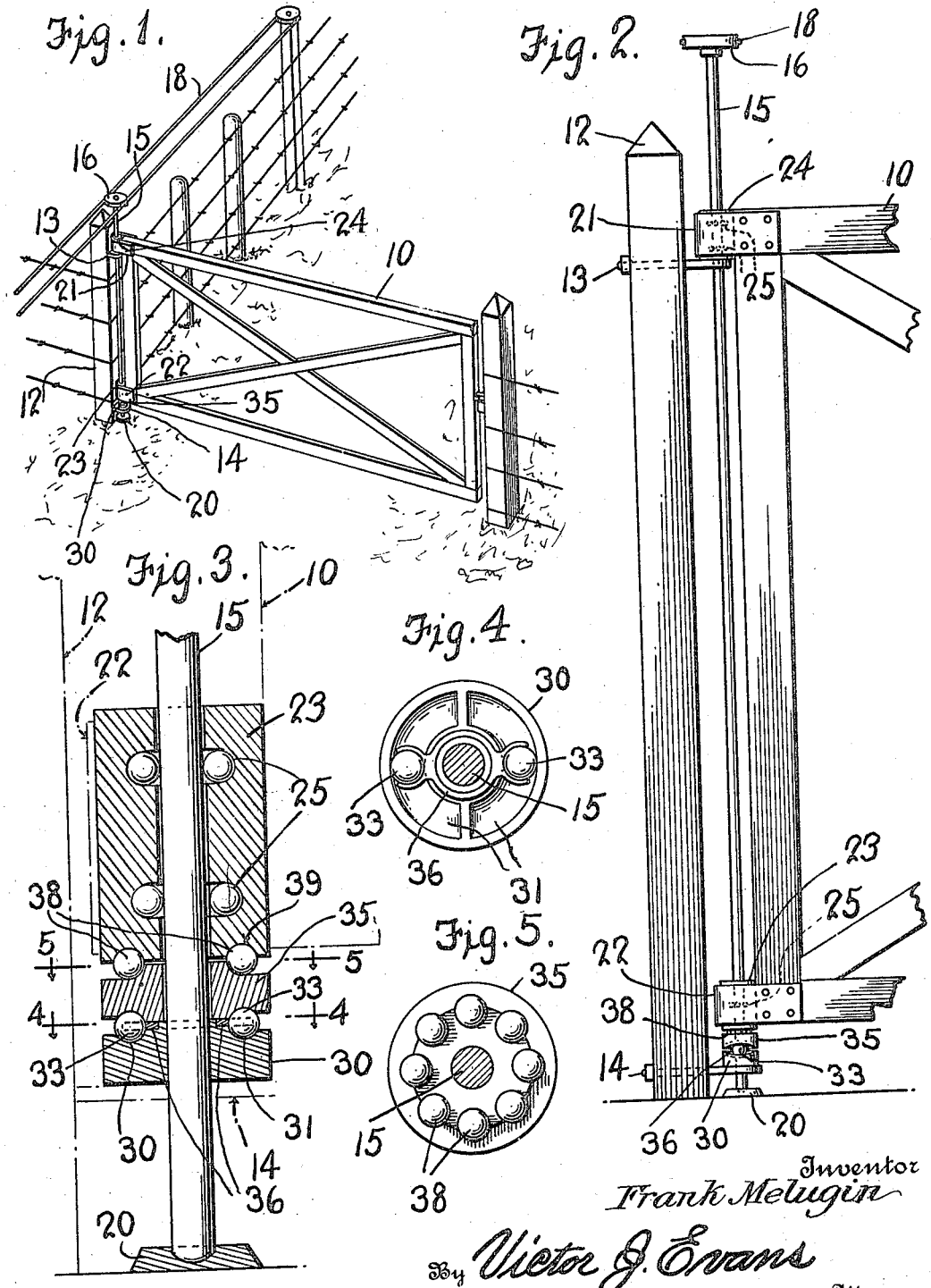

FRANK MELUGIN, OF WEBB CITY, MISSOURI.

GATE-HINGE.

1,383,961. Specification of Letters Patent. Patented July 5, 1921.

Application filed September 7, 1918. Serial No. 253,041.

*To all whom it may concern:*

Be it known that I, FRANK MELUGIN, a citizen of the United States, residing at Webb City, in the county of Jasper and State of Missouri, have invented new and useful Improvements in Gate-Hinges, of which the following is a specification.

This invention relates to gate mounting means, and the object is to provide a certain novel structure whereby a gate may be mounted, with means for releasing the gate and throwing it to open position and retaining it in said position.

A further object is to provide, in connection with the operating means, certain novel mounting means including a plurality of anti-friction devices, certain of which are formed with cam surfaces permitting and causing the raising of the gate and retaining the latter in open position after having been thrown to that position by the operating means.

With the foregoing and other objects in view, the invention consists in the novel construction, combination and arrangement of elements hereinafter described and claimed.

In the drawings, Figure 1 is a perspective view showing in general the manner of mounting the gate, and also showing the operating means; Fig. 2 is a fragmentary view showing the mounting means in side elevation; Fig. 3 is a vertical section showing the structure for hinging the lower portion of the gate; Figs. 4 and 5 are plan views of race plates.

A gate which may be of ordinary or any preferred construction is designated 10 and includes a plurality of uprights, longitudinal members, and diagonal braces, the gate being mounted upon a post 12. A plurality of eye bolts 13 and 14 are secured to the post and serve to mount a vertical shaft 15 carrying a wheel 16 at the upper end thereof. This wheel is rotated in the operation of the opening of the gate by means of a heavy cord or other suitable flexible device designated 18. The lower end of the shaft is supported on a suitable base 20.

Rigidly connected with the gate 10 by means of strap hinges 21 and 22 are cylindrical members 23 and 24, these members being provided with internal bores having grooves forming race ways for the balls 25. The upper member 24 may be provided with two race ways and the lower member 23 may likewise have two raceways.

Carried rigidly by shaft 15 is a race plate 30 having a cam shaped surface formed in the manner shown and being provided with grooves or channels 31 on its upper face for the reception of the series of balls 33. A race plate 35 is loosely mounted on shaft 15 and is provided with a cam shaped surface on the lower side thereof corresponding with the similar surface formed on race plate 30. Between these elements 30 and 35 is a ball retaining device 36 shown in detail in Fig. 4.

The upper surface of face plate 35 is provided with a centrally located element having cutaway portions in the sides thereof, each adapted to receive one of the balls of the series 38, these balls coöperating with the recesses 39 in the lower side of cylindrical member 23. By this construction I provide flexibility, and at the same time provide for the rotation of race plate 35 with cylindrical member 23.

The partial rotation of the shaft and its rigid element 30, by pulley 16, in opening the gate causes the balls of the series between the cam shaped surfaces to ride upwardly upon the lower cam surfaces for the purpose of raising the gate. The further movement will cause the cam surfaces to assume a position with reference to each other for retaining the gate in open position until sufficient force is exerted for restoring the parts to their original position when the gate is intentionally closed. The initial rotary movement raises the gate, in view of the cam action, and when the highest point is reached, the weight of the gate will necessarily cause the balls to pass down the incline presented by the cam surface, and the resulting rotary movement of element 35 will be transmitted to element 23, in view of the fact that the balls 38 are in recesses in element 35 (Fig. 5), and in recesses in element 23, rigid with the gate. At the completion of this movement the gate is open.

I therefore provide for the rigid mounting of the gate and for the operation thereof with a minimum amount of friction between the moving elements, and provide for the release or opening movement and the holding of the gate in open position, these operations being in a sense automatic and resulting from the partial rotation of the main vertical shaft 15 by means of the cord 18 and the pulley 16 engaged by the cord.

What is claimed is:

In a device of the class described, a vertical shaft, means for mounting the latter, a tubular member carried by the shaft and provided with internal grooves constituting race ways, balls located in said grooves and bearing on the shaft, means for securing the tubular member to a gate or the like, a race plate rigidly mounted on the shaft and provided with a cam surface comprising oppositely located depressed portions provided with grooves, a second race plate having a cam surface similarly formed on that side adjacent to the race plate first named, a series of balls between the second race plate and tubular member and means for retaining the individual balls in position between said elements last named causing them to rotate together upon the shaft.

In testimony whereof I affix my signature in presence of two witnesses.

FRANK MELUGIN.

Witnesses:
FRANK W. BAIR,
L. O. WALKER.